US006062471A

United States Patent [19]

Palmeri

[11] Patent Number: 6,062,471

[45] Date of Patent: May 16, 2000

[54] SORTING TABLE

[76] Inventor: Gregory Palmeri, 16 Dillon Circuit, Gray, Northern Territory, 0830, Australia

[21] Appl. No.: 09/184,450

[22] Filed: Nov. 2, 1998

[51] Int. Cl.[7] .................................................. B65G 11/00

[52] U.S. Cl. ......................... 232/48; 312/324; 232/43.1

[58] Field of Search .................................. 312/211, 212, 312/35, 324, 327, 328; 108/3, 5, 6, 7, 25; 221/289, 174; 232/47, 48, 50, 44, 43.1

[56] References Cited

U.S. PATENT DOCUMENTS

| | | | |
|---|---|---|---|
| 1,220,549 | 3/1917 | Pludowski | 232/47 |
| 2,994,453 | 8/1961 | Gardiner | 312/324 X |
| 5,148,974 | 9/1992 | Clapper | 232/43.1 X |

FOREIGN PATENT DOCUMENTS

| | | | |
|---|---|---|---|
| 80370/91 | 1/1992 | Australia . | |
| 538401 | 6/1955 | Belgium | 232/43.1 |
| 3006967 | 9/1981 | Germany | 312/211 |
| 627538 | 8/1949 | United Kingdom | 312/328 |

*Primary Examiner*—Janet M. Wilkens

*Attorney, Agent, or Firm*—DeLio & Peterson, LLC

[57] ABSTRACT

A device (11) for assisting a person to select one or more articles from a plurality of articles and for placing any unselected articles in a container; the device having a pair of members (24, 25) and an opening beneath the members, wherein the members can pivot away from each other so as to open and close the opening, and when the opening is closed, a plurality of articles can be placed on the members and one or more articles can be selected therefrom and when the opening is opened by the members, any articles on the surface can pass through the opening and into a container located beneath the opening.

3 Claims, 4 Drawing Sheets

SORTING TABLE

FIELD OF THE INVENTION

The present invention is directed towards a device which may be used to assist a person to sort and select one or more articles from a number of other articles stored in a container, and after the selection has been made to place any unselected articles into another or the same container.

It is often necessary to select one or more articles from a number of other articles stored in a container. For example, a person may wish to select an article such as a nut or bolt of a particular size or type from a container in which numerous nuts and bolts of different types and sizes are stored. If the desired article is located towards the top of the container, a person may simply remove it by hand. However, if the article is located near the bottom of the container it is usually necessary to tip all the articles onto a flat surface so as to be able to pick out the desired article. A disadvantage of this method is that after the selection is made, the articles must be returned to the container by hand. This is generally tedious and time consuming.

It is therefore an object of the present invention to provide a device for assisting a person to select one or more articles from a number of articles stored in a container and for placing unselected articles into the same or a different container.

SUMMARY OF THE INVENTION

According to a broad form of the invention there is provided a device for assisting a person to select one or more articles from a plurality of articles, the device having an opening, a member mounted for pivotable movement between a substantially horizontal position in which the opening is closed and an open position, the member having a sorting surface upon which when the member is in the closed position, articles may be placed on the surface and at least one article can be selected and when the member is pivoted to the open position the whole of the sorting surface moves such that any or all articles thereon can pass through the opening.

The device of the present invention may be used to sort and select any type of article. Examples of articles which may be sorted are nuts, bolts or other mechanical parts, sewing items such as buttons or stationary. The size of the device may of course be varied to suit the types of articles with which it is intended to be used.

Preferably the device is mounted on legs such that the surface upon which the articles are to be placed is at a convenient height for a person to use. Typically the device is about table height. Thus, when the device is not being used for sorting it may also be used as a table or work surface. Optionally, the legs may have wheels such that the device is mobile and may be moved around a workshop floor to a desired location. Alternatively, the device may have relatively short legs so as to enable it to be used when placed on a table top or similar surface.

The member of the device is movable so as to open and close the opening. The member may open and close the opening by any suitable means. Preferably, the member is hingedly mounted to a frame so that the member may pivot between open and closed positions. It is not necessary for the whole of the member to be able to move so as to open and close the opening. For example, a trap door may be provided through which articles may pass through to the opening.

In the embodiment in which the member pivots between open and closed positions, the device includes means for maintaining and returning the member in and to the closed position. The member may be retained in the closed position by any suitable means. Typically, the frame has one or more projections upon which the lower surface of the member may abut or which engage corresponding recesses in the member. Alternatively, projections may be provided on the member which may locate in corresponding recesses in the frame. The projections may be movable between extended and withdrawn positions. Preferably the projections are biased towards the withdrawn position. When the projections are withdrawn, the member is then able to pivot towards the open position.

When the member has pivoted to the open position, the member may be returned to the closed position by any suitable means. For example, the member may be attached to a handle or lever which can be operated by the user so as to return the member to the closed position.

In another embodiment, the member may be biased towards the closed position by biasing means such as a spring or elasticised member. The member may be pivoted against the bias towards the open position by a user. After use, the biasing means returns the member to the closed position.

In another form of the invention, the member may be adapted to slide horizontally between open and closed positions. Typically a handle or lever will be provided to allow an operator to slide the member between positions.

The device of the present invention may also include two or more members. Preferably, the device has two members which have edges which abut in the closed position and these edges pivot away from each other towards the open position.

When the member is in the closed position, articles from a container may be placed on the surface. A person can then sort through the articles on the surface and select one or more articles as desired. After the selection is made, the same or a different container is placed beneath the opening. When the member is moved to the open position, the articles pass through the opening and are received by the container. Preferably the device is provided with means such as a funnel placed around the opening for guiding the articles into the container.

BRIEF DESCRIPTION OF THE DRAWINGS

A preferred embodiment of the present invention will now be described with reference to the following figures in which:

FIG. 1 illustrates a preferred device 11 of the present invention. The device 11 has a rectangular upper portion 12 which is supported by four legs 13, 14, 15, 16. The upper portion 12 has a surface 18 and four walls 19, 20, 21, 22 depending therefrom. The walls define a lip 23 about surface 18. The surface 18 comprises two trays 24, 25. Each tray 24, 25 is hingedly connected to a pair of legs, 13, 14 and 15, 16. An opening surrounded by a funnel 26 is located at the bottom of the device 11.

Figure 2:
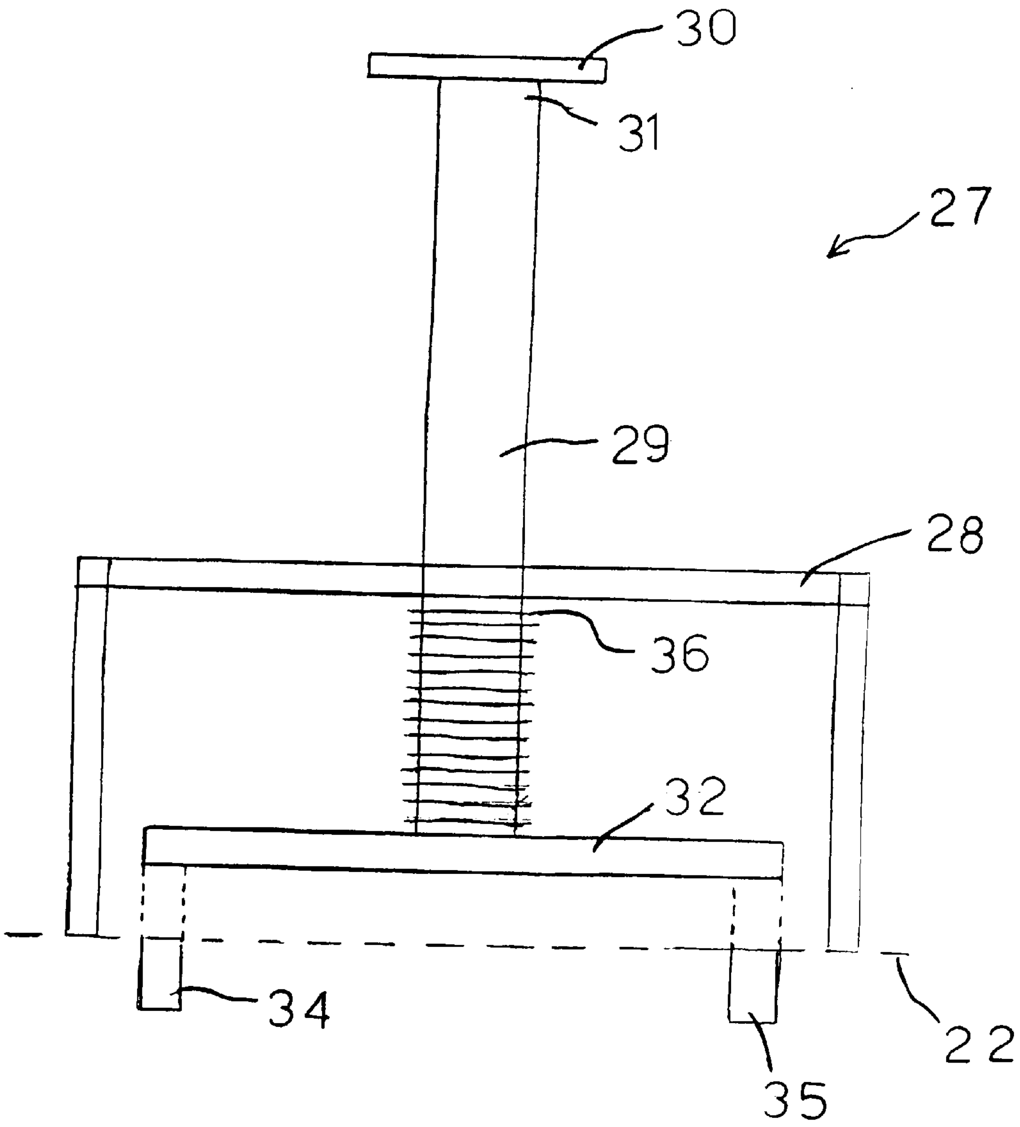

Wall 22 has a tray release mechanism 27 located thereon. The release mechanism is illustrated in detail in FIG. 2. The mechanism 27 has a housing 28. A shaft 29 protrudes from the housing. A knob 30 is attached to the protruding end 31 of the shaft 29. A plate 32 is located within the housing and attached to the other end of the shaft 29. The plate has two projections 34, 35 extending therefrom. The projections 34, 35 extend through wall 22. The projections 34, 35 have ramped lower faces (not illustrated). A coil spring 36 surrounds the end 33 of the shaft attached to plate 32. The spring biases the projections 34, 35 towards the illustrated position in which they extend through wall 22. Edges 37, 38 of trays 24, 25 rest on projections 34, 35. Alternatively, the projections may be located in recesses provided in the edges 37, 38 of the trays. In use, a person may grasp and pull knob 30 away from wall 22. This pulls plate 32 against the bias of spring 34 and withdraws projections 34, 35 through wall 22. When this occurs, the projections no longer support the trays 24, 25. The edges 37, 38 of the trays pivot away from each other under gravity. When the person ceases pulling on knob 30, the projections are returned to their original positions. The trays 24, 25 remain in the released position.

Located beneath the release mechanism 27 on wall 22, is a handle 40. The handle 40 has two arms 41, 42 which protrude through slots 43, 44 in wall 22. The arms 41, 42 extend substantially all the way through the device towards opposing wall 21. When the trays have been released and pivot downwardly as described above, the trays pivot until they meet and rest on arms 41, 42. Thus when the trays are in this released position they define a V shaped opening. Any articles which are located on the trays will fall though this opening. The trays are returned to the closed position by grasping handle 40 and raising it so that arms 41, 42 slide along slots 43, 44. In this way the trays are pivoted upwards. Edges 37, 38 of the trays slide up and over the ramped lower surfaces of projections 34, 35. When handle 40 is released, the trays remain in the closed position.

Figure 1:
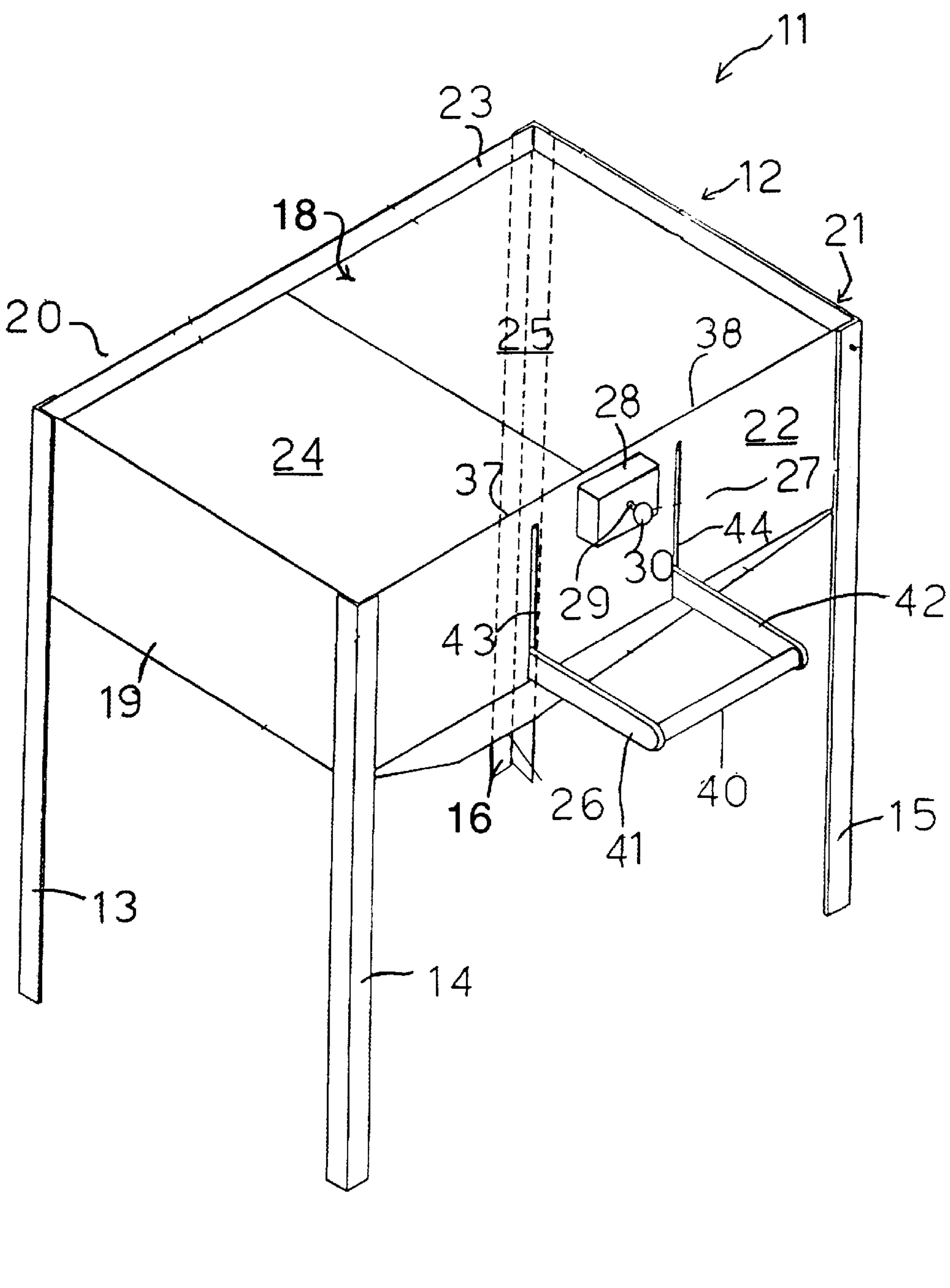
FIG. 1 illustrates a perspective view of a preferred device of the present invention and FIG. 2 illustrates a detail of the tray release mechanism of the device illustrated in FIG. 1.
Figure 3:
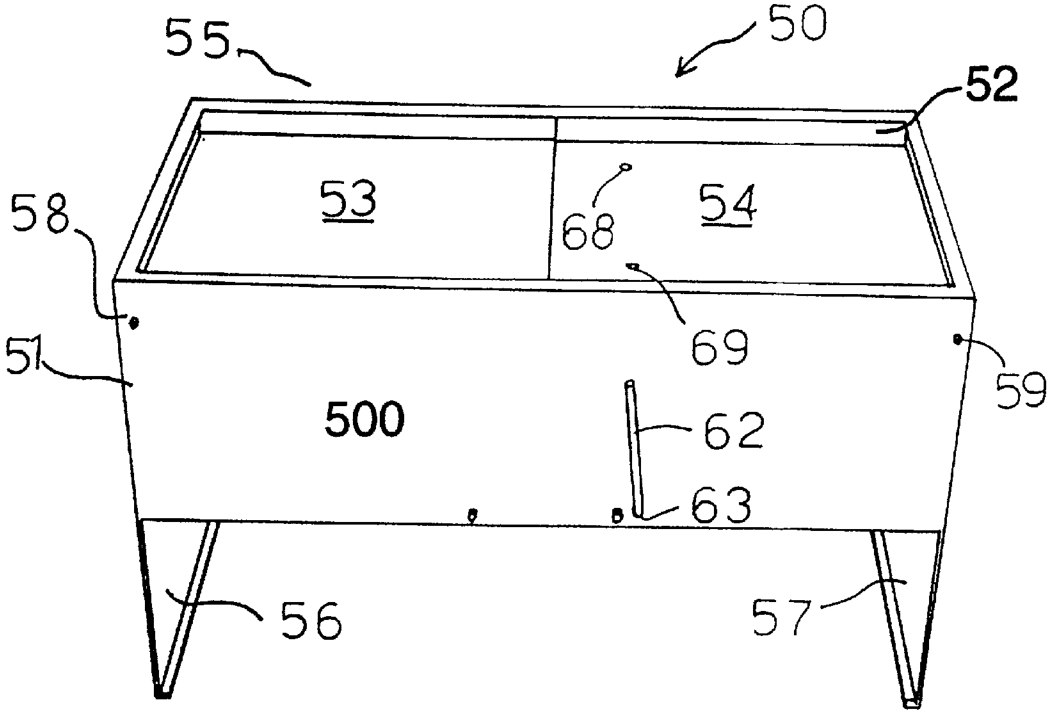
FIG. 3 illustrates a perspective view of a further preferred device of the present invention in the closed position.

FIG. 3 illustrates a further preferred device 50 of the present invention. The device is similar to that illustrated in FIG. 1 in that it has a frame 51, a front wall 50, a rectangular top surface 55 formed from a pair of trays 53, 54, surrounded by a lip 52 and leg members 56, 57. The leg members 56, 57 are shorter than that of the device in FIG. 1. The length of the leg members enables the device 51 to be placed upon a work surface such as a table or work bench. The device is sized to allow it to be transported from a storage position, such as beneath a work bench to a use position, upon the work bench. Handles (not illustrated) may be provided if desired.

Figure 4:
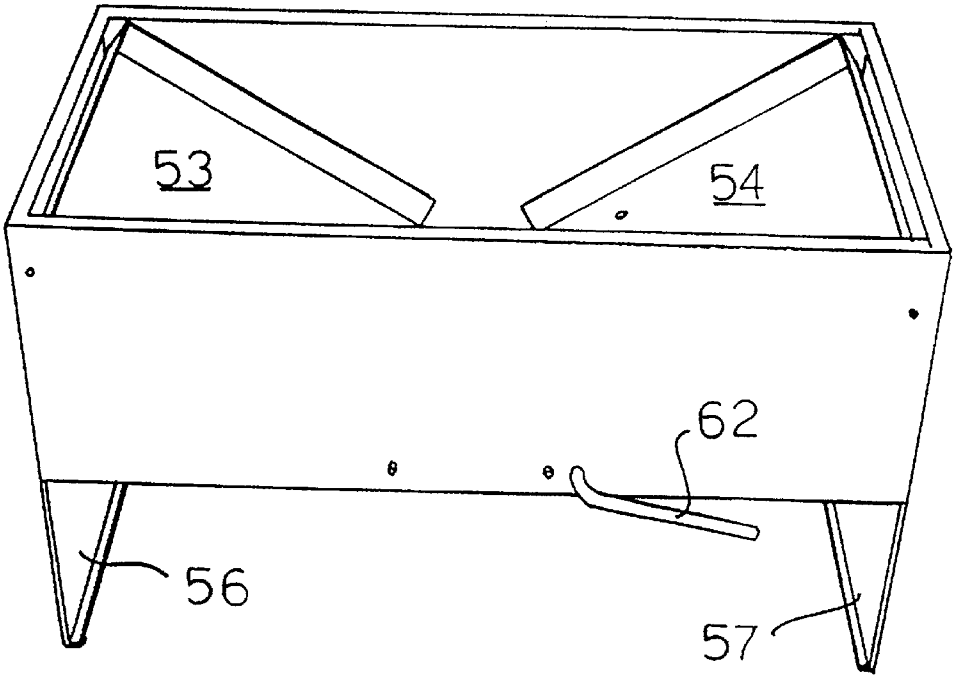
FIG. 4 illustrates a perspective view of the device of FIG. 3 in the open position.
Figure 5:
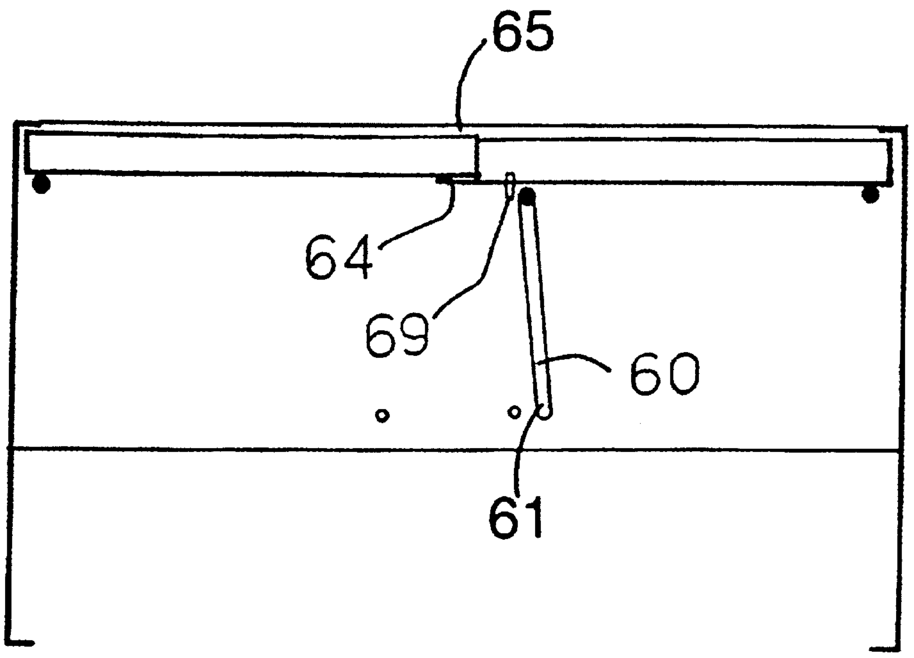
FIG. 5 is a front elevational view of the device illustrated in FIG. 3.
Figure 6:
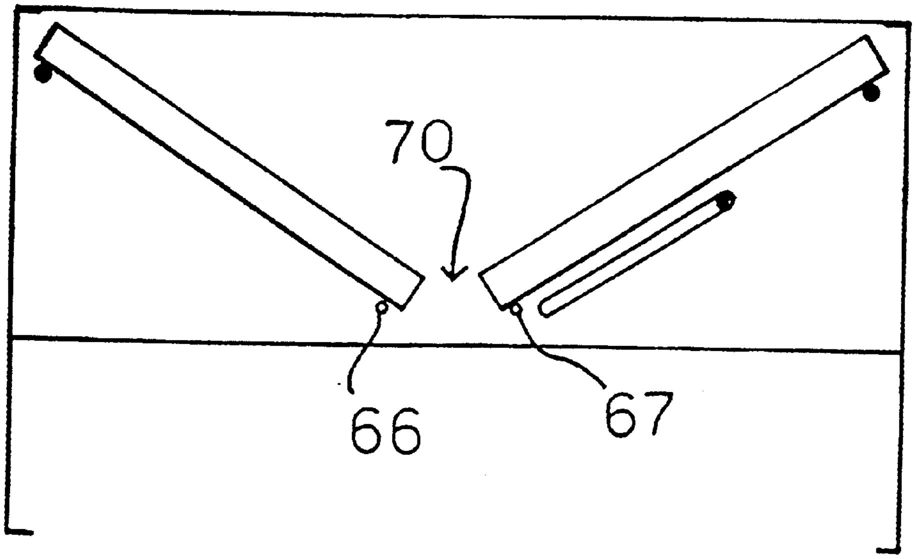
FIG. 6 is a front elevational view of the device illustrated in FIG. 4.

The operation of device 50 can be described by reference to FIGS. 5 and 6 which schematically illustrates the device with the front wall 500 removed. The device 50 has two trays 53, 54 pivotally connected to frame 51 at pivot points 58, 59. The trays pivot between a closed position illustrated in FIGS. 3 and 5 and an open position illustrated in FIGS. 4 and 6. Tray 53 is supported in the closed position by an inverted square u-shaped member 60. The member 60 is pivotable about pivot point 61, between an upstanding tray position as illustrated in FIG. 5 and a tray release position as illustrated in FIG. 6. U-shaped member 60 is operated by a handle 62 which protrudes through an aperture 63 in the front wall 500 of the device. Tray 54 has a lip 64 upon which the edge 65 of tray 53 rests when in the closed position. The u-shaped member 60 is pivoted to the open position by operation of handle 62. Both trays 53, 54 are then allowed to pivot downwardly. Horizontal bars 66, 67 are provided to limit downwards movement of the trays such that they are at an angle of about 45°. The open trays define an opening 70.

The aperture of device 51 is similar to that described above. Articles to be sorted are placed on the closed trays 53, 54. After the desired articles have been selected and removed, an operator rotates handle 62 clockwise to release the trays. Unwanted articles are allowed to fall through the opening 70 where they can be received in a container (not illustrated).

To return the trays to the closed position tray 53 may be manually pivoted upwards and tray 54 pivoted upwards by rotating handle 62 in an anti-clockwise direction until member 60 is upstanding and supporting tray 54 in the closed position. Inwardly facing projections 68, 69 prevent member 60 from being pivoted past the vertical position. Tray 53 may then be released such that it is supported by lip 64.

The device may be used to assist a person in sorting or separating one or more articles from a number of articles in a container in the following manner. The contents of a container containing articles to be sorted are tipped onto the upper surface of the device with the trays in the closed position. The articles are distributed over the surface. This enables the person to locate one or more desired articles which may then be removed from the surface. When a selection has been made the articles may be returned to the same or a different container. The container in which the remaining articles are to be stored is placed beneath the device. The trays are then released by pulling knob 30 or rotating handle 62. The articles which remain on the trays fall through the V shaped opening defined by the open trays. The trays are then returned to the closed position by operation of handle 40 or 62 as described above.

It can be seen the device of the present invention may be used to assist a person in sorting and selecting desired articles from a number of articles stored in a container and for returning the remaining articles to or placing the articles in another container.

I claim:

1. A device for assisting a person to select one or more articles from a plurality of articles, the device having a frame supported by leg members;

an upper sorting surface formed from a pair of adjacent trays, the trays being mounted for pivotable movement to said frame between a horizontal closed position and an open position in which the adjacent edges of the trays are spaced apart to define an opening therebetween; and an inverted u-shaped member pivotable between an upstanding position in which the inverted u-shaped member supports the trays in the horizontal closed position and an inclined position which allows the trays to pivot towards the open position, such that in use articles are placed on the sorting surface when the trays are in the closed position to enable one or more articles to be selected therefrom and when the trays are pivoted to the open position, unselected articles are able to pass through the opening.

2. A device for assisting a person to select one or more articles from a plurality of articles, the device having a frame supported by leg members;

an upper sorting surface formed from a pair of adjacent trays, the trays being mounted for pivotable movement to said frame between a horizontal closed position and an open position in which the adjacent edges of the trays are spaced apart to define an opening therebetween;

an inverted u-shaped member pivotable between an upstanding position in which the inverted u-shaped member supports the trays in the horizontal closed position and an inclined position which allows the trays to pivot towards the open position; and stops fixedly attached to said frame for stopping downward pivotable movement of said trays, such that in use articles are placed on the sorting surface when the trays are in the closed position to enable one or more articles to be selected therefrom and when the trays are pivoted to the open position, unselected articles are able to pass through the opening.

3. A device for assisting a person to select one or more articles from a plurality of articles, the device having a frame supported by leg members;

an upper sorting surface formed from a pair of adjacent trays, the trays being mounted for pivotable movement to said frame between a horizontal closed position and an open position in which the adjacent edges of the trays are spaced apart to define an opening therebetween;

an inverted u-shaped member pivotable between an upstanding position in which the inverted u-shaped member supports the trays in the horizontal closed position and an inclined position which allows the trays to pivot towards the open position; and stops fixedly attached to said frame for limiting downward pivotable movement of said trays to an angle of 45° in the open position, such that in use articles are placed on the sorting surface when the trays are in the closed position to enable one or more articles to be selected therefrom and when the trays are pivoted to the open position, unselected articles are able to pass through the opening.

* * * * *